(12) United States Patent  (10) Patent No.: US 8,508,913 B2
Saruban et al.  (45) Date of Patent: Aug. 13, 2013

(54) LAMINATE TYPE ELECTRONIC COMPONENT AND MANUFACTURING METHOD THEREFOR

(75) Inventors: Masahito Saruban, Nagaokakyo (JP); Makoto Ogawa, Nagaokakyo (JP); Wataru Ogawa, Nagaokakyo (JP); Akihiro Motoki, Nagaokakyo (JP); Syunsuke Takeuchi, Nagaokakyo (JP); Yoji Yamamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 43 days.

(21) Appl. No.: 13/337,445

(22) Filed: Dec. 27, 2011

(65) Prior Publication Data

US 2012/0169180 A1   Jul. 5, 2012

(30) Foreign Application Priority Data

Jan. 5, 2011   (JP) .................................. 2011-000388

(51) Int. Cl.
*H01G 4/228*  (2006.01)
(52) U.S. Cl.
USPC ..... 361/306.3; 361/303; 361/305; 361/321.1; 361/321.2; 361/306.1
(58) Field of Classification Search
USPC .......... 361/306.3, 306.1, 303–305, 311–313, 361/321.1, 321.2, 308.1, 309
See application file for complete search history.

(56) References Cited

U.S. PATENT DOCUMENTS

| | | | |
|---|---|---|---|
| 6,195,248 B1 * | 2/2001 | Kunishi et al. ................ 361/305 |
| 6,839,221 B2 * | 1/2005 | Sugimoto et al. .......... 361/321.2 |
| 6,960,366 B2 * | 11/2005 | Ritter et al. .................... 427/79 |
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 * | 3/2008 | Trinh .......................... 361/306.3 |
| 7,463,474 B2 | 12/2008 | Ritter et al. |
| 8,149,566 B2 * | 4/2012 | Motoki et al. ................ 361/305 |
| 8,194,390 B2 * | 6/2012 | Kim et al. .................... 361/321.2 |
| 8,351,181 B1 * | 1/2013 | Ahn et al. .................... 361/321.2 |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |

FOREIGN PATENT DOCUMENTS

JP   63-169014 A   7/1988

* cited by examiner

*Primary Examiner* — Nguyen T Ha
(74) *Attorney, Agent, or Firm* — Keating & Bennett, LLP

(57) ABSTRACT

In a method of manufacturing a laminate type electronic component, when a heat treatment is carried out after plating films, which at least partially define external electrodes, are formed by growing plated depositions deposited on exposed ends of a plurality of internal electrodes in a component main body, the presence of the plating films may not only interfere with moisture release, but may also cause blisters or bulge defects in the plating films, while moisture such as a plating solution in the component main body is removed by evaporation. To avoid such problems, cuts to divide exposed ends into multiple sections are formed in extending sections of internal electrodes. Thus, plating films include slits extending in the stacking direction at locations corresponding to positions of the cuts.

7 Claims, 6 Drawing Sheets

LAMINATE TYPE ELECTRONIC COMPONENT AND MANUFACTURING METHOD THEREFOR

BACKGROUND OF THE INVENTION

1. Field of the Invention

The present invention relates to a laminate type electronic component and a method for manufacturing the laminate type electronic component, and more particularly, relates to a laminate type electronic component including an external electrode formed directly by plating such that the external electrode is connected electrically to a plurality of internal electrodes, and a method for manufacturing the laminate type electronic component.

2. Description of the Related Art

Laminate type electronic components typified by laminated ceramic capacitors are, in general, provided with a component main body which has a stacked structure including, for example, a plurality of stacked functional material layers composed of a dielectric ceramic, and a plurality of layered internal electrodes formed along the interfaces between the functional material layers. The respective ends of the plurality of internal electrodes are exposed, for example, at each of first and second end surfaces of the component main body, and external electrodes are formed so as to electrically connect the respective ends of the internal electrodes to each other.

For the formation of the external electrodes, typically, a conductive paste including a metal constituent and a glass constituent is applied onto the end surfaces of the component main body, and then subjected to firing, thereby forming paste electrode layers first. The paste electrode layers serve to electrically connect the internal electrodes to each other. Next, a first plating layer containing, for example, nickel as its main constituent is formed on the paste electrode layers, and a second plating layer containing, for example, tin or gold as its main constituent is further formed thereon. The second plating layer is intended to ensure solderability, whereas the first plating layer serves to prevent solder erosion in the case of a solder joint.

As described above, the external electrode is typically composed of the three-layer structure of the paste electrode layer, the first plating layer, and the second plating layer.

However, the paste electrode layer described above has a large thickness of several tens μm to several hundreds μm. Therefore, in order to limit the dimensions of the laminate type electronic component up to certain specifications, there is undesirably a need to reduce the effective volume for ensuring a capacitance, because there is a need to ensure the volume for the paste electrode layers. On the other hand, the plating layers each have a thickness on the order of several μm. Thus, if the external electrodes can be composed only of plating layers, a larger effective volume can be ensured for ensuring the capacitance.

For example, Japanese Patent Application Laid-Open No. 63-169014 discloses depositing conductive metal films by electroless plating over the entire surfaces of sidewalls of a component main body, at which internal electrodes are exposed, so as to short-circuit the internal electrodes exposed at the sidewalls, and using the conductive metal films as external electrodes.

However, in the method for forming external electrodes as described in Japanese Patent Application Laid-Open No. 63-169014, the ends with the internal electrodes exposed are subjected to plating directly, and thus, the ingress of a plating solution into the component main body may occur along the interface between the internal electrodes and the insulator layers. In addition, the ingress of moisture other than the plating solution into the component main body may occur.

On the other hand, for the purpose of enhancing the fixing strength of the plating films to serve as external electrodes with the component main body, a heat treatment may be carried out at a temperature on the order of 800° C. or more after the plating step. In this case, commonly, the moisture in the component main body will be removed by evaporation with the aid of the heat treatment. However, the path for releasing moisture in the component main body is covered with the plating films after the plating step, thus not only interfering with the release of moisture, but also causing blisters or bulge defects in the plating films.

SUMMARY OF THE INVENTION

Preferred embodiments of the present invention provide a laminate type electronic component which solves the problems described above, and a method for manufacturing the laminate type electronic component.

A laminate type electronic component according to a preferred embodiment of the present invention includes a component main body of a stacked structure including a plurality of internal electrodes; and plating films at least partially constituting external electrodes, which are disposed directly on an outer surface of the component main body so as to be electrically connected to the plurality of internal electrodes, wherein the internal electrodes each include a main section and an extending section extending from the main section, and ends of the extending sections include exposed ends arranged to be exposed in contact with the plating film at the outer surface of the component main body.

In order to solve the technical problems described above, each of the extending sections of the present preferred embodiment preferably includes a cut arranged to divide the exposed end into multiple sections, the plurality of cuts formed in the plurality of extending sections are aligned in the stacking direction of the component main body, and the plating films include slits provided therein so as to extend in the stacking direction at locations corresponding to positions of the cuts.

The respective sections of the exposed ends divided by the cuts described above preferably have a longitudinal dimension of about 0.6 mm or less, for example.

In addition, the open ends of the cuts preferably have a width dimension of about 10 μm or less, for example.

In addition, the external electrodes preferably each further include an upper plating film arranged on the plating film so as to fill the slits.

Various preferred embodiments of the present invention are advantageously applied to a laminate type electronic component in which the external electrodes include first and second external electrodes, the internal electrodes include a plurality of first internal electrodes electrically connected to the first external electrode, and a plurality of second internal electrodes electrically connected to the second external electrode, and the respective exposed ends of the first and second external electrodes as well as of the first and second internal electrodes are located on one surface of the component main body.

According to another preferred embodiment of the present invention, a method for manufacturing a laminate type electronic component includes a component main body preparation step of preparing a component main body of a stacked structure including a plurality of internal electrodes; and an external electrode formation step of forming plating films at least partially constituting external electrodes, directly on an outer surface of the component main body so as to be electrically connected to the plurality of internal electrodes.

The internal electrodes formed in the component main body prepared in the component main body preparation step each include a main section and an extending section extending from the main section, ends of the extending sections include exposed ends formed so as to be exposed in contact with the plating film at the outer surface of the component main body, each of the extending sections includes a cut formed to divide the exposed end into multiple sections, and the plurality of cuts formed in the plurality of extending sections are aligned in the stacking direction of the component main body.

The external electrode formation step includes a plating step of growing plated depositions deposited on the respective exposed ends at least in the stacking direction, thereby forming the plating films so as to form slits extending in the stacking direction at locations corresponding to positions of the cuts.

Furthermore, the manufacturing method according to a preferred embodiment of the present invention includes, after the plating step, a heat treatment step of subjecting the component main body to a heat treatment.

The external electrode formation step preferably further includes, after the heat treatment step, a step of forming an upper plating film on the plating film while filling the slits.

According to a preferred embodiment of the present invention, the extending sections of the internal electrodes include the cuts formed to divide the exposed ends into multiple sections, and as a result, the plating films include slits formed to correspond to the positions of the cuts.

These slits define paths that release moisture. Therefore, considering the length of the path to release moisture inside the component main body, when the plating films have slits formed as in a preferred embodiment of the present invention, as compared with cases of plating films with no slits, the length of the path for releasing moisture can be reduced, and the moisture can be made more likely to be released from the inside of the component main body in the heat treatment. Therefore, according to various preferred embodiments of the present invention, as a result of the heat treatment, blisters can be advantageously prevented from being caused in the plating films.

In various preferred embodiments of the present invention, when the respective sections of the exposed ends divided by the cuts described above have a longitudinal dimension of about 0.6 mm or less, the advantageous effects described above are produced with more certainty.

In addition, the open ends of the cuts, which preferably have a width dimension of about 10 μm or less, for example, make it easier to grow the upper plating films by plating so as to form bridges over the slits of the base plating films, in the case of forming the upper plating films on the plating films to fill the slits of the plating films.

As described above, when the external electrodes further include the upper plating films formed on the base plating films to fill the slits, the respective surfaces of the external electrodes will not be divided, but provided by uniform films. Thus, the mountability of the laminate type electronic component, for example, by reflow soldering, in particular, the alignment accuracy can be improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A shows a cross section along the plane in which a first internal electrode 5 is located, whereas FIG. 1B shows a cross section along the plane in which a second internal electrode 6 is located.

DETAILED DESCRIPTION OF THE PREFERRED EMBODIMENTS

Figure 6:
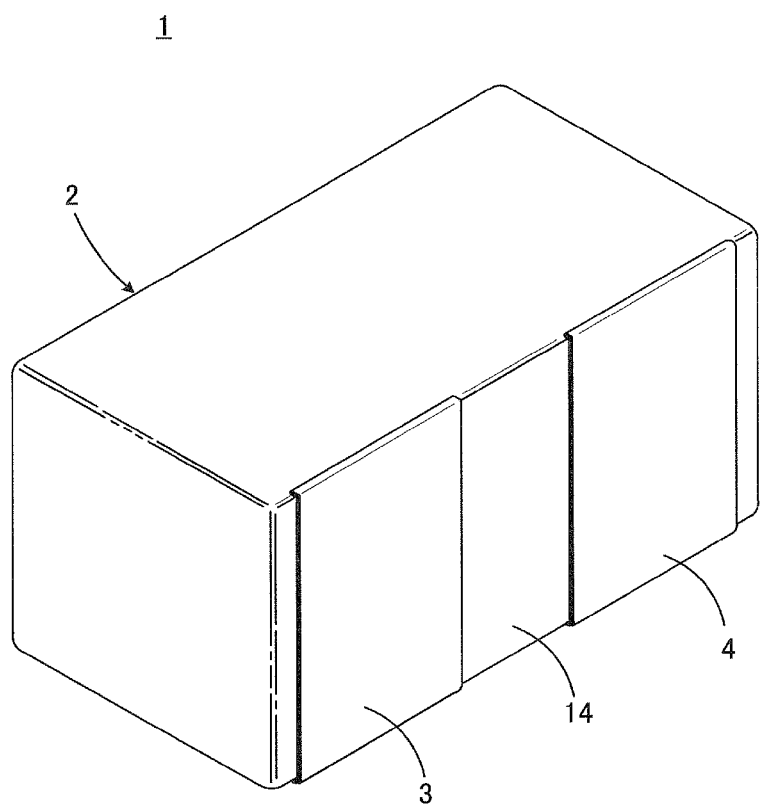
FIG. 6 is a perspective view illustrating the appearance of the component main body 2 in the stage shown in FIG. 5, that is, the laminate type electronic component 1 as a completed product.

First, as shown in FIG. 6, a laminate type electronic component 1 according to a preferred embodiment of the present invention includes a component main body 2, and first and second external electrodes 3 and 4 are disposed on the outer surface of the component main body 2.

Figure 1A:
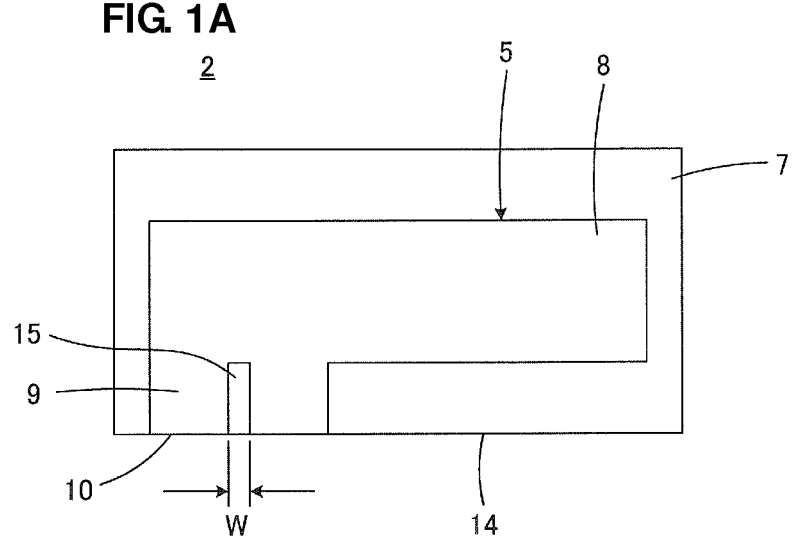
FIGS. 1A and 1B are plan views illustrating internal structures of a component main body 2 included in a laminate type electronic component 1 according to a preferred embodiment of the present invention, where
Figure 1B:
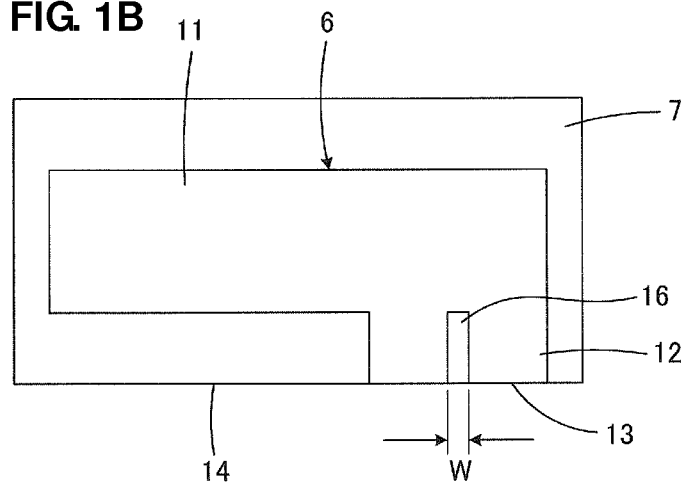
Figure 2:
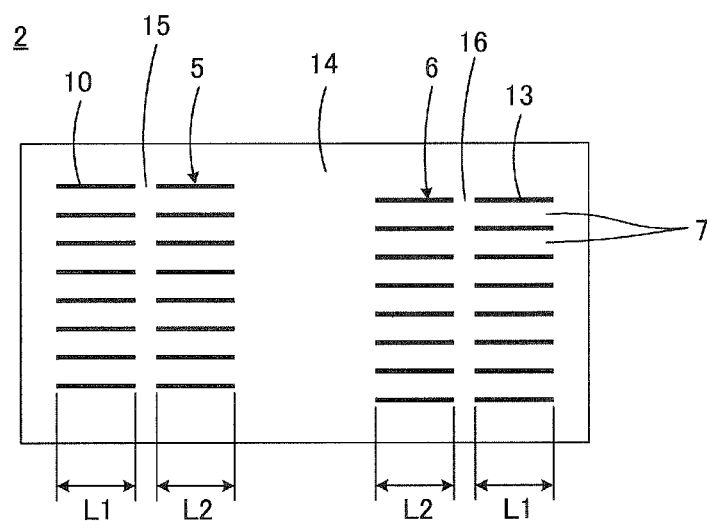
FIG. 2 is a front view of the component main body 2 shown in FIG. 1.

The component main body 2 includes a plurality of first internal electrodes 5 and a plurality of second internal electrodes 6 disposed therein as shown in FIGS. 1 and 2. More specifically, the component main body 2 has a stacked structure including a plurality of stacked functional material layers 7, and the first and second internal electrodes 5 and 6 are arranged along the interfaces between the functional material layers 7. The first internal electrodes 5 and the second internal electrodes 6 are arranged alternately in the stacking direction. The internal electrodes 5 and 6 include, for example, nickel as their main constituent.

When the laminate type electronic component 1 constitutes a laminated ceramic capacitor, the functional material layers 7 preferably are composed of a dielectric ceramic. It is to be noted that the laminate type electronic component 1 may constitute other components such as an inductor, a thermistor, and a piezoelectric component, for example. Therefore, depending on the function of the laminate type electronic component 1, the functional material layers 7 may be composed of, besides a dielectric ceramic, a magnetic ceramic, a semiconductor ceramic, a piezoelectric ceramic, etc., and further may be composed of a material other than ceramics, for example, a material containing a resin.

The first internal electrode 5 includes, as shown in FIG. 1A, a main section 8 and an extending section 9 extending from the main section 8, and the extending section 9 includes, at the end thereof, an exposed end 10 exposed to the outer surface of the component main body 2. The second internal electrode 6 includes, as shown in FIG. 1B, a main section 11 and an extending section 12 extending from the main section 11, and the extending section 12 includes, at the end thereof, an exposed end 13 exposed to the outer surface of the component main body 2. While the exposed end 10 of the first internal electrode 5 and the exposed end 13 of the second internal electrode 6, as well as both the first and second external electrodes 3 and 4 are preferably provided on one side surface 14 of the component main body 2 in this preferred embodiment, this type of formation is optional and is not essential to the present invention. Therefore, the exposed ends and the external electrodes may be provided on any surface of the component main body 2.

The extending sections 9 and 12 of the first and second internal electrodes 5 and 6 respectively include cuts 15 and 16 arranged to divide each of the exposed ends 10 and 13 into multiple sections. In addition, as shown in FIG. 2, the plurality of cuts 15 provided in the plurality of extending sections 9 of the plurality of first internal electrodes 5 are aligned in the stacking direction of the component main body 2. Likewise, the plurality of cuts 16 provided in the plurality of extending sections 12 of the plurality of second internal electrodes 6 are also aligned in the stacking direction of the component main body 2.

While the cuts 15 and 16 are shown to preferably have a rectangular or substantially rectangular shape in the drawing, other shapes may be adopted such as, for example, a triangle.

A method for manufacturing the laminate type electronic component 1, in particular, a method for forming the external electrodes 3 and 4 will be described below to demonstrate the structures of the external electrodes 3 and 4.

First, after obtaining the component main body 2 which has such a structure as described above, it is preferable to apply a polishing treatment to the surface of the component main body 2 in order to adequately expose the exposed ends 10 and 13 of the internal electrodes 5 and 6.

Figure 3:
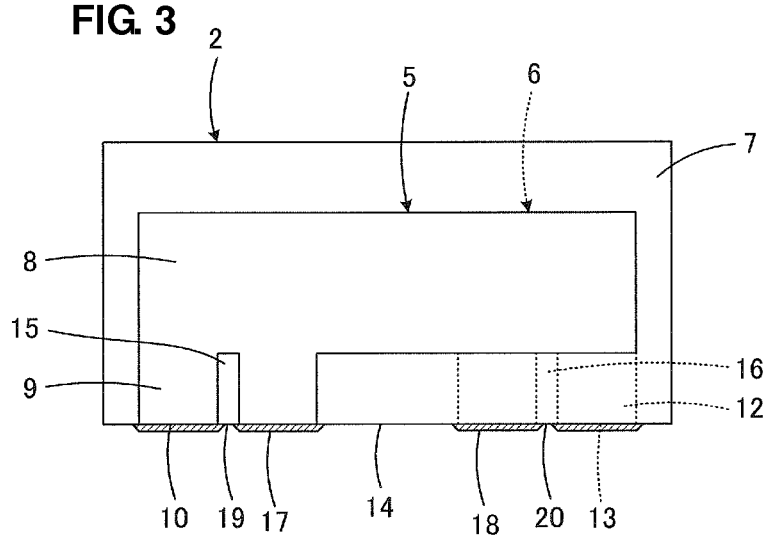
FIG. 3 is a drawing corresponding to FIG. 1A, which is a plan view illustrating the component main body 2 with base plating films 17 and 18 arranged to partially constitute external electrodes 3 and 4, and shows a cross section along the plane in which the first internal electrode 5 is located.
Figure 4:
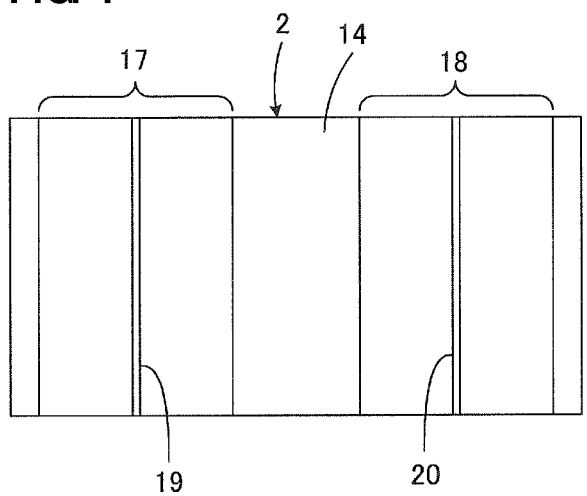
FIG. 4 is a front view of the component main body 2 in the stage shown in FIG. 3.

Next, as shown in FIGS. 3 and 4, plating films 17 and 18 to define bases for the external electrodes 3 and 4 are formed directly on the side surface 14 of the component main body 2. The plating method for forming the base plating films 17 and 18 may be an electrolytic plating method of depositing metal ions in a plating solution through the application of an electric current, or an electroless plating method of depositing the metal ions with the use of a reducing agent.

The base plating films 17 and 18 preferably are formed by depositing metal ions in a plating solution on the respective exposed ends 10 and 13 of the internal electrodes 5 and 6 in the component main body 2, and further growing the plated depositions deposited and forming bridges between the respective adjacent exposed ends 10 and 13 of the internal electrodes 5 and 6 in the stacking direction.

In this case, the exposed ends 10 and 13 are respectively divided by the cuts 15 and 16, and thus, in the positions of the cuts 15 and 16, no plating film is formed except for plating growth from the respective end edges of the exposed ends 10 and 13 in a direction in which the side surface 14 extends. Therefore, the base plating films 17 and 18 respectively include slits 19 and 20 formed in the positions of the cuts 15 and 16 to extend in the stacking direction.

While the slits 19 and 20 are preferably formed to extend along the stacking direction of the component main body 2 in FIG. 4, the slits 19 and 20 may be stopped or end in any position in the middle. More specifically, the base plating films 17 and 18 may each have respective sections partitioned respectively by the slits 19 and 20, but partially connected to each other.

The base plating films 17 and 18 described above preferably include, for example, copper as their main constituent. This is because copper exhibits favorable electrical conductivity, and provides favorable throwing power in the case of a plating treatment, thus making it possible to improve the efficiency of the plating treatment, and increase the fixing strength of the external electrodes 3 and 4 with the component main body 2.

As shown in FIG. 6, the external electrodes 3 and 4 are not only formed on the side surface 14 of the component main body 2, but also preferably are formed so that respective end edges of the external electrodes 3 and 4 reach a pair of principal surfaces which are adjacent to the side surface 14. In order to allow this form of the external electrodes 3 and 4 to be formed efficiently, although not shown, dummy conductors may be formed on the ends of the principal surfaces of the component main body 2, which are adjacent to the side surface 14, and/or in an outer layer section of the component main body 2. These dummy conductors make no substantial contribution to the development of electrical characteristics, but act to provide the deposition of metal ions for the formation of the plating films and to promote the plating growth.

Next, after carrying out cleaning, the component main body 2 is subjected to a heat treatment. As the heat treatment temperature, a temperature of, for example, about 600° C. or more, preferably about 800° C. or more is adopted. This heat treatment is not only intended to enhance the fixing strength of the base plating films 17 and 18 with the component main body 2, but also intended to remove moisture such as a plating solution in the component main body 2 by evaporation. The moisture to be removed by evaporation is at least partially released to the outside through the slits 19 and 20 formed in the base plating films 17 and 18. Therefore, moisture can be made more likely to be released from the inside of the component main body 2, as compared with a case in which this type of slit is not formed. Accordingly, blisters can be prevented in the plating films 17 and 18.

The slits 19 and 20 described above act to reduce in size the continuously extending sections of the base plating films 17 and 18, thereby further shortening the path for releasing moisture, and as a result, further improving the effect of releasing moisture. Therefore, in order to further improve the effect of releasing moisture, it is effective to further reduce in size the respective sections of the base plating films 17 and 18, which are divided by the slits 19 and 20. In order to further reduce in size the respective sections of the base plating films 17 and 18, which are divided by the slits 19 and 20, the respective sections of the exposed ends 10 and 13 divided by the cuts 15 and 16 of the extending sections 9 and 12 may be made shorter in longitudinal dimensions L1 and L2 (see FIG. 2). As can be seen from an experimental example described later, it is effective for the respective sections of the exposed ends 10 and 13 divided by the cuts 15 and 16 to have longitudinal dimensions L1 and L2 of, for example, about 0.6 mm or less each, in order to improve the effect of releasing moisture.

In addition, in order to further shorten the longitudinal dimensions of the respective sections of the exposed ends divided by the cuts, multiple cuts may be formed for one extending section to divide the exposed ends into three or more.

Figure 5:
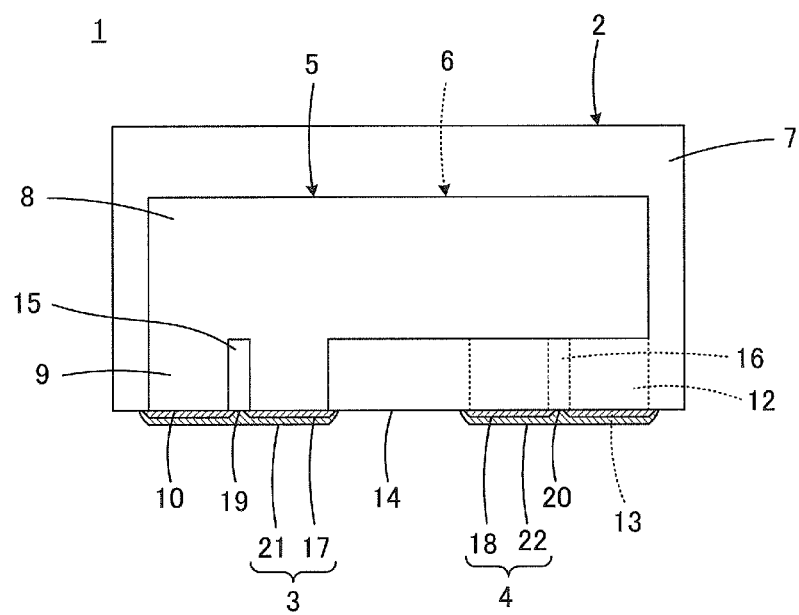
FIG. 5 is a drawing corresponding to FIG. 1A, which is a plan view illustrating upper plating layers 21 and 22 formed on the base plating films 17 and 18 shown in FIG. 3, and shows a cross section along the plane in which the first internal electrode 5 located.

Next, if necessary, upper plating films 21 and 22 are respectively formed on the base plating films 17 and 18, as shown in FIG. 5. The upper plating films 21 and 22 are preferably formed so as to fill the slits 19 and 20 located in the base plating films 17 and 18. The upper plating films 21 and 22 preferably have, for example, a two-layer structure including a solder barrier layer of a plating layer containing nickel as its main constituent, and a solderability providing layer of a plating layer containing tin or gold as its main constituent, which is formed on the solder barrier layer to provide solderability.

When the upper plating films 21 and 22 are formed as described above, the respective surfaces of the external electrodes 3 and 4 will not be divided, but provided by uniform films. Thus, as can be seen from the experimental example described later, the mountability of the laminate type electronic component 1, for example, by reflow soldering, in particular, the alignment accuracy can be improved.

In addition, in the formation of the upper plating films 21 and 22, in order to make it easier to grow the upper plating films 21 and 22 by plating so as to form bridges over the slits 19 and 20 of the base plating films 21 and 22, the open ends of the cuts 15 and 16 formed in the extending sections 9 and 12 are preferably made to have a width dimension W (see FIG. 1) of about 10 μm or less, for example, thereby further reducing the slits 19 and 20 of the base plating films 17 and 18 in width dimension, as can be seen from the experimental example described later.

After the formation of the upper plating films 21 and 22, cleaning is carried out to complete the laminate type electronic component 1.

It is to be noted that while the laminate type electronic component 1 shown in the drawing preferably is a two-terminal component provided with the two external electrodes 3 and 4, the present invention can also be applied to multi-terminal laminate type electronic components including three or more terminals.

Next, an experimental example will be described which was carried out for confirming the advantageous effects of various preferred embodiments of the present invention.

In this experimental example, laminated ceramic capacitors as samples were prepared in accordance with the following steps.

(1) Preparation of Component Main Body
(2) Formation of Base Plating Film by Electrolytic Copper Plating
(3) Heat Treatment
(4) Formation of Upper Plating Film by Electrolytic Nickel Plating
(5) Formation of Upper Plating Film by Electrolytic Tin Plating The details of the respective steps (1) to (5) are as follows.
(1) Preparation of Component Main Body Component main bodies according to each of samples 1 to 5 as shown in Table 1 were prepared as component main bodies for laminated ceramic capacitors with such a structure as shown in FIGS. 1 and 2.

The component main bodies according to each of samples 1 to 5 were in common 3.2 mm in length, 1.6 mm in width, and 1.6 mm in height, in which functional material layers were composed of a barium titanate-based dielectric ceramic, internal electrodes contained nickel as their main constituent, the functional material layers between adjacent internal electrodes had a thickness of 6 μm, and the number of stacked internal electrodes was 431.

In addition, for each of samples 1 to 5, the open ends of the cuts in the extending sections of the internal electrodes were made to have a width dimension as shown in the column "Cut Width" of Table 1, and the respective sections of the exposed ends divided by the cuts were made to have longitudinal dimensions as shown in the column "Length of Exposed End" of Table 1. The reference symbols "L1" and "L2" in the column "Length of Exposed End" of Table 1 correspond to the reference symbols "L1" and "L2" shown in FIG. 2. It is to be noted that, for sample 4, the extending sections had no cuts formed therein, and thus, in Table 1, the item "Cut Width" is shown as 0, and the items "L1" and "L2" are shown respectively as 1 mm and 0 mm.

The component main bodies were each subjected to firing, and then barrel polishing to expose the exposed ends of the internal electrodes adequately.
(2) Formation of Base Plating Film by Electrolytic Copper Plating Next, for each sample, 500 component main bodies were put in a 300 ml horizontal rotation barrel, in addition, 100 ml of a medium of 0.7 mm in diameter was put therein, and electrolytic copper plating was carried out while rotating the barrel at a peripheral speed of 2.6 m/min.

In this electrolytic copper plating, first, while using the following Cu strike bath, Cu strike plating was carried out at a current density of 0.10 A/dm$^2$ until a film thickness of approximately 1 μm was achieved.
<Copper Strike Bath>
Copper Pyrophosphate: 14 g/L
Pyrophosphoric Acid: 120 g/L
Potassium Oxalate: 10 g/L
pH: 8.7
Bath Temperature: 25° C.

Then, after carrying out cleaning with pure water, while using the following thick Cu bath, thick Cu plating was carried out at a current density of 0.30 A/dm$^2$ until a film thickness of approximately 5 μm was achieved.
<Thick Cu Bath>
"Pyro-Bright Process" from C. Uyemura & Co., Ltd.
pH: 8.6
Bath Temperature: 55° C.

Then, cleaning was carried out with pure water.

At the stage of the electrolytic copper plating completed, the observation of the obtained base plating films found that slits extending in the stacking direction were formed in the positions of cuts formed in the extending sections of the internal electrodes in the case of samples 1 to 3 and 5.
(3) Heat Treatment Next, a heat treatment was carried out for keeping at a temperature of 800° C. for 20 minutes in a nitrogen atmosphere.

At the stage of this heat treatment having been completed, the "Incidence of Blister" was evaluated as shown in Table 1. More specifically, for each sample, 500 component main bodies were observed under a metallograph to obtain the number of component main bodies containing a blister, and the ratio of the number of component main bodies with one or more blisters was obtained as the "Incidence of Blister". In this case, the component main body with a blister was defined as having the copper plating film with one or more bulges of about 20 μm or more in diameter, for example.
(4) Formation of Upper Plating Film by Electrolytic Nickel Plating Next, for each sample, 30 ml of the component main bodies were put in a 300 ml horizontal rotation barrel, in addition, 70 ml of solder balls of 0.7 mm in diameter were put therein, and electrolytic nickel plating was carried out while rotating the barrel at a barrel rotation speed of 20 rpm.

In this electrolytic nickel plating, with the use of a Watts bath (weakly acidic Ni bath), an electric current was applied for 60 minutes at a bath temperature of 60° C., a pH of 4.2 and a current density of 0.20 A/dm$^2$ to obtain nickel plating films of approximately 4 μm in film thickness.

Then, cleaning was carried out with pure water.

The column "Bridge Formed By Nickel Plating Film" of Table 1 shows results of evaluating whether or not the nickel plating films achieved such bridges that filled the slits of the base plating films for samples 1 to 3 and 5 at the stage of the electrolytic nickel plating completed. In the column "Bridge Formed By Nickel Plating Film", the mark "O" indicates that bridge formation is achieved, whereas the "x" indicates that no bridge formation is achieved.

(5) Formation of Upper Plating Film by Electrolytic Tin Plating

Next, electrolytic tin plating was carried out in the same apparatus as and under the same conditions as those in the electrolytic nickel plating described above, except that with the use of "NB-RZS" from Ishihara Chemical Co., Ltd. as an electrolytic tin plating bath, an electric current was applied for 60 minutes at a bath temperature of 30° C., a pH of 4.5 and a current density of 0.10 $A/dm^2$ to obtain tin plating films of approximately 4 μm in film thickness.

Then, cleaning was carried out with pure water.

The laminated ceramic capacitors according to each sample, obtained in the way described above, were evaluated for "Self-Alignment Property", as shown in Table 1. For the "Self-Alignment Property", the laminated ceramic capacitor was displaced by 0.15 mm from the center of the substrate land in the longitudinal direction, the position of the laminated ceramic capacitor was observed after reflow to determine the laminated ceramic capacitor as a defective if the capacitor failed to return to the center of the substrate land, and in Table 1, the mark "x" was put when one or more laminated ceramic capacitors were determined as defective(s) among 50 capacitors, whereas the mark "O" was put in the other case.

TABLE 1

| Sample Number | Cut Width [μm] | Length of Exposed End L1 [mm] | Length of Exposed End L2 [mm] | Bridge Formed By Nickel Plating Film | Incidence of Blister [%] | Self-Alignment Property |
|---|---|---|---|---|---|---|
| 1 | 10 | 0.5 | 0.5 | O | 0 | O |
| 2 | 10 | 0.6 | 0.4 | O | 0 | O |
| 3 | 10 | 0.7 | 0.3 | O | 30 | O |
| 4 | 0 | 1 | 0 | — | 100 | O |
| 5 | 20 | 0.5 | 0.5 | X | 0 | X |

As can be seen from Table 1, sample 4 provided "O" for the "Self-Alignment Property", but 100% for "Incidence of Blister", because of the "Length of Exposed End" of 1 mm over 0.6 mm, and moreover, because of no cuts formed therein.

In contrast to sample 4, samples 1 to 3 and 5 succeeded in the reduction of the "Incidence of Blister" down to 30% or less, because of the cuts formed therein, and thus the slits formed in the copper plating films to serve as the base plating films.

In particular, samples 1, 2, and 5 succeeded in the "Incidence of Blister" of 0%, because of the "Length of Exposed End" of 0.6 mm or less for both the "L1" and "L2".

In addition, samples 1 to 3 provided "O" for "Bridge Formed By Nickel Plating Film", and accordingly provided "O" for "Self-Alignment Property", because of the "Cut Width" of 10 μm or less.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminate type electronic component comprising:
a component main body having a stacked structure including a plurality of internal electrodes arranged in a stacking direction; and
plating films at least partially constituting external electrodes and disposed directly on an outer surface of the component main body so as to be electrically connected to the plurality of internal electrodes; wherein
each of the plurality of internal electrodes includes a main section and an extending section extending from the main section, and ends of the extending sections include exposed ends that are exposed in contact with the plating film at the outer surface of the component main body;
each of the extending sections includes a cut arranged to divide the exposed end into multiple sections, the plurality of cuts in the plurality of extending sections are aligned in the stacking direction of the component main body; and
the plating films include slits located therein so as to extend in the stacking direction at locations corresponding to positions of the cuts.

2. The laminate type electronic component according to claim 1, wherein respective sections of the exposed ends divided by the cuts have a longitudinal dimension of about 0.6 mm or less.

3. The laminate type electronic component according to claim 1, wherein open ends of the cuts have a width dimension of about 10 μm or less.

4. The laminate type electronic component according to claim 1, wherein each of the external electrodes includes an upper plating film that is disposed on the plating film and arranged to fill the slit.

5. The laminate type electronic component according to claim 1, wherein the external electrodes comprise first and second external electrodes, the internal electrodes comprise a plurality of first internal electrodes electrically connected to the first external electrode, and a plurality of second internal electrodes electrically connected to the second external electrode, and the respective exposed ends of the first and second external electrodes and of the first and second internal electrodes are located on one surface of the component main body.

6. A method for manufacturing a laminate type electronic component, the method comprising:
a component main body preparation step of preparing a component main body having a stacked structure including a plurality of internal electrodes arranged in a stacking direction; and
an external electrode formation step of forming plating films at least partially constituting external electrodes, directly on an outer surface of the component main body so as to be electrically connected to the plurality of internal electrodes; wherein
the internal electrodes formed in the component main body prepared in the component main body preparation step each comprise a main section and an extending section extending from the main section, ends of the extending sections include exposed ends formed so as to be exposed in contact with the plating film at the outer surface of the component main body, each of the extending sections includes a cut that divides the exposed end into multiple sections, the plurality of cuts formed in the plurality of extending sections are aligned in the stacking direction of the component main body;
the external electrode formation step includes a plating step of growing plated depositions deposited on the respective exposed ends at least in the stacking direction, thereby forming the plating films so as to form slits extending in the stacking direction at locations corresponding to positions of the cuts; and the method further comprises, after the plating step, a heat treatment step of subjecting the component main body to a heat treatment.

7. The method for manufacturing a laminate type electronic component according to claim 6, wherein the external electrode formation step further comprises, after the heat treatment step, a step of forming an upper plating film on the plating film such that the upper plating film fills the slit.

* * * * *